United States Patent
Jordan et al.

(10) Patent No.: US 10,903,979 B2
(45) Date of Patent: Jan. 26, 2021

(54) BATCHED EXECUTION OF ENCRYPTION OPERATIONS

(71) Applicant: INTERNATIONAL BUSINESS MACHINES CORPORATION, Armonk, NY (US)

(72) Inventors: Michael J. Jordan, Woodstock, NY (US); Tamas Visegrady, Zurich (CH); John C. Dayka, New Paltz, NY (US); Michael C. Osborne, Richterswil (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 97 days.

(21) Appl. No.: 16/205,977

(22) Filed: Nov. 30, 2018

(65) Prior Publication Data

US 2020/0177370 A1    Jun. 4, 2020

(51) Int. Cl.
*H04L 9/06* (2006.01)
*G09C 1/00* (2006.01)
*G06F 21/60* (2013.01)
*H04L 9/08* (2006.01)

(52) U.S. Cl.
CPC .......... *H04L 9/0631* (2013.01); *G06F 21/602* (2013.01); *G09C 1/00* (2013.01); *H04L 9/0838* (2013.01)

(58) Field of Classification Search
CPC ... H04L 9/0631; H04L 9/0838; H04L 9/0637; G09C 1/00; G06F 21/602
See application file for complete search history.

(56) References Cited

U.S. PATENT DOCUMENTS

| | | | |
|---|---|---|---|
| 9,635,011 B1 | 4/2017 | Wu et al. | |
| 9,818,108 B2 | 11/2017 | von Mueller et al. | |
| 9,858,436 B2* | 1/2018 | Arnold | G06F 16/22 |
| 2008/0082834 A1* | 4/2008 | Mattsson | G06F 12/1408 |
| | | | 713/189 |

(Continued)

FOREIGN PATENT DOCUMENTS

WO    WO2017123199 A1    7/2017

OTHER PUBLICATIONS

Mell, Peter and Tim Grance, "The NIST Definition of Cloud Computing," National Institute of Standards and Technology, Information Technology Laboratory, Special Publication 800-145, Sep. 2011, pp. 1-7.

(Continued)

*Primary Examiner* — Cheng-Feng Huang
(74) *Attorney, Agent, or Firm* — Teddi Maranzano, Esq.; Kevin P. Radigan, Esq.; Heslin Rothenberg Farley & Mestiti P.C.

(57) ABSTRACT

Batched execution of encryption operations is performed. A batched set of data for which format-preserving encryption is to be performed is obtained. The batched set of data includes a plurality of fields of data, which are independent of one another. Multiple rounds of format-preserving encryption are performed on the plurality of fields of data to provide an output of format-preserved encrypted data. A round of format-preserving encryption includes calling an encryption function to perform one or more encryption operations on the plurality of fields of data in parallel.

17 Claims, 12 Drawing Sheets

(56) References Cited

U.S. PATENT DOCUMENTS

| | | | |
|---|---|---|---|
| 2010/0318468 A1 | 12/2010 | Carr et al. | |
| 2014/0108813 A1* | 4/2014 | Pauker | G06F 21/6218 |
| | | | 713/189 |
| 2015/0237020 A1* | 8/2015 | Rohloff | H04L 63/0428 |
| | | | 713/168 |
| 2015/0294118 A1* | 10/2015 | Parker | H04L 63/06 |
| | | | 726/26 |
| 2015/0310087 A1* | 10/2015 | Tidwell | G06F 16/258 |
| | | | 713/189 |
| 2016/0224795 A1* | 8/2016 | Arnold | G06F 21/6245 |
| 2016/0224802 A1* | 8/2016 | Arnold | G06F 21/6245 |
| 2017/0048059 A1 | 2/2017 | Murray | |
| 2017/0104756 A1 | 4/2017 | Rosenthal et al. | |
| 2017/0124166 A1* | 5/2017 | Thomas | G06F 16/24568 |
| 2018/0357427 A1* | 12/2018 | Lindell | G06F 21/602 |
| 2019/0079984 A1* | 3/2019 | Lancaster | G06F 16/258 |

OTHER PUBLICATIONS

IBM, "z/Architecture—Principles of Operation," IBM Publication No. SA22-7832-11, Twelfth Edition, Sep. 2017, pp. 1-1902.
Rogaway, Phillip, "A Synopsis of Format-Preserving Encryption," Mar. 2010, pp. 1-12.

* cited by examiner

| BLOCK SIZE | BLOCK COUNT | TOTAL TIME | PER-BLOCK TIME | TIME WITH SINGLE BLOCKS | N vs. SINGLE BLOCK TIME (%) |
|---|---|---|---|---|---|
| 16 | 1 | 84.2 | 84.2 | 84.2 | 100 |
| 32 | 2 | 104.3 | 52.2 | 168.4 | 61.9359 |
| 48 | 3 | 109 | 36.3 | 252.6 | 43.1512 |
| 64 | 4 | 112.7 | 28.2 | 336.8 | 33.462 |
| 80 | 5 | 117.4 | 23.5 | 421 | 27.886 |
| 96 | 6 | 121.1 | 20.2 | 505.2 | 23.9707 |
| 112 | 7 | 126.4 | 18.1 | 589.4 | 21.4455 |
| 128 | 8 | 131.1 | 16.4 | 673.6 | 19.4626 |
| 144 | 9 | 135.5 | 15.1 | 757.8 | 17.8807 |
| 160 | 10 | 140.2 | 14 | 842 | 16.6508 |
| 192 | 12 | 148.6 | 12.4 | 1010.4 | 14.707 |
| 224 | 14 | 165.7 | 11.8 | 1178.8 | 14.0567 |
| 256 | 16 | 166.9 | 10.4 | 1347.2 | 12.3887 |
| 288 | 18 | 175.3 | 9.7 | 1515.6 | 11.5664 |
| 320 | 20 | 183.2 | 9.2 | 1684 | 10.8789 |
| 384 | 24 | 201.5 | 8.4 | 2020.8 | 9.9713 |
| 416 | 26 | 210.4 | 8.1 | 2189.2 | 9.61082 |
| 448 | 28 | 219.5 | 7.8 | 2357.6 | 9.31032 |
| 512 | 32 | 237.2 | 7.4 | 2694.4 | 8.80344 |
| 576 | 36 | 254.9 | 7.1 | 3031.2 | 8.40921 |
| 640 | 40 | 272.2 | 6.8 | 3368 | 8.08195 |
| 704 | 44 | 289.8 | 6.6 | 3704.8 | 7.82228 |
| 768 | 48 | 307.5 | 6.4 | 4041.6 | 7.60837 |
| 832 | 52 | 325.8 | 6.3 | 4378.4 | 7.44107 |
| 896 | 56 | 344.1 | 6.1 | 4715.2 | 7.29768 |
| 960 | 60 | 363.5 | 6.1 | 5052 | 7.19517 |
| 1024 | 64 | 379.2 | 5.9 | 5388.8 | 7.03682 |

FIG. 4

OBTAIN A BATCHED SET OF DATA FOR WHICH FORMAT-PRESERVING ENCRYPTION IS TO BE PERFORMED ~600

THE BATCHED SET OF DATA INCLUDES A PLURALITY OF FIELDS OF DATA, THE PLURALITY OF FIELDS OF DATA BEING INDEPENDENT OF ONE ANOTHER ~602

PERFORM MULTIPLE ROUNDS OF FORMAT-PRESERVING ENCRYPTION ON THE PLURALITY OF FIELDS OF DATA OF THE BATCHED SET OF DATA TO PROVIDE AN OUTPUT OF FORMAT-PRESERVED ENCRYPTED DATA ~604

A ROUND OF FORMAT-PRESERVING ENCRYPTION INCLUDES CALLING AN ENCRYPTION FUNCTION TO PERFORM ONE OR MORE ENCRYPTION OPERATIONS ON THE PLURALITY OF FIELDS OF DATA IN PARALLEL ~606

THE PLURALITY OF FIELDS OF DATA ARE OF ONE OR MORE RECORDS OF A DATABASE ~608

THE ROUND OF FORMAT-PRESERVING ENCRYPTION INCLUDES USING A SHARED KEY OF THE PLURALITY OF FIELDS OF DATA IN THE FORMAT-PRESERVING ENCRYPTION OF THE PLURALITY OF FIELDS OF DATA ~610

AT LEAST ONE FIELD OF DATA OF THE PLURALITY OF FIELDS OF DATA IS DIVERSIFIED WITH RESPECT TO OTHER FIELDS OF DATA OF THE PLURALITY OF FIELDS OF DATA ~612

DESERIALIZE THE OUTPUT OF FORMAT-PRESERVED ENCRYPTED DATA TO PROVIDE A PLURALITY OF FORMAT-PRESERVED ENCRYPTED FIELDS OF DATA ~614

FIG. 6A

THE OBTAINING THE BATCHED SET OF DATA INCLUDES

ISSUING ONE OR MORE SELECT STATEMENTS TO OBTAIN THE PLURALITY OF FIELDS OF DATA ~620

COLLATING THE PLURALITY OF FIELDS OF DATA INTO THE BATCHED SET OF DATA ~622

DETERMINE A NUMBER OF FIELDS TO BE INCLUDED IN THE BATCHED SET OF FIELDS, THE DETERMINING BEING BASED ON A PERFORMANCE SCALING FUNCTION OF A HARDWARE ENGINE USED IN PERFORMING THE FORMAT-PRESERVING ENCRYPTION ~624

THE OBTAINING THE BATCHED SET OF DATA INCLUDES

DETERMINING WHICH FIELDS OF DATA OF A DATABASE ARE TO BE PROCESSED THROUGH FORMAT-PRESERVING ENCRYPTION ~626

GROUPING THE FIELDS OF DATA TO BE PROCESSED THROUGH FORMAT-PRESERVING ENCRYPTION INTO ONE OR MORE GROUPS OF FIELDS OF DATA BASED ON ONE OR MORE CRITERIA ~628

THE PLURALITY OF FIELDS OF DATA ARE SELECTED FROM A GROUP OF FIELDS OF DATA OF THE ONE OR MORE GROUPS OF FIELDS OF DATA ~630

THE ONE OR MORE CRITERIA INCLUDE AT LEAST ONE CRITERION SELECTED FROM A GROUP OF CRITERIA CONSISTING OF: SAME TYPE OF FIELD, SHARED KEYS, AND A SAME NUMBER OF FORMAT-PRESERVING ENCRYPTION ITERATIONS TO BE PERFORMED ~632

GROUPING FURTHER INCLUDES GROUPING THE FIELDS OF DATA BASED ON WHETHER THE FIELDS OF DATA ARE IN A SAME RECORD OF THE DATABASE, IN WHICH THE PLURALITY OF FIELDS OF DATA SELECTED FROM THE GROUP OF FIELDS OF DATA ARE OF THE SAME RECORD ~634

FIG. 6B

BATCHED EXECUTION OF ENCRYPTION OPERATIONS

BACKGROUND

One or more aspects relate, in general, to processing within a computing environment, and in particular, to performing cryptographic operations within the computing environment.

To secure data and/or communications within a computing environment, cryptography is employed. Cryptography protects information within the computing environment by making it secret or hidden from view. One component of cryptography is encryption, which converts the input (e.g., plaintext) into encrypted output (e.g., ciphertext), and another component of cryptography is decryption, which converts the encrypted output back into the plaintext.

One type of encryption is format-preserving encryption (FPE). Format-preserving encryption encrypts data in such a way that the output (e.g., the ciphertext) is in the same format as the input (e.g., the plaintext). Format-preserving encryption is a collective term of cryptographic permutations generally based on tight loops of iterative, chained, serialized calls to block-oriented cryptographic primitives, such as an AES (Advanced Encryption Standard) block cipher.

SUMMARY

Shortcomings of the prior art are overcome, and additional advantages are provided through the provision of a computer program product for facilitating processing within a computing environment. The computer program product includes a computer readable storage medium readable by a processing circuit and storing instructions for performing a method. A batched set of data for which format-preserving encryption is to be performed is obtained. The batched set of data includes a plurality of fields of data, which are independent of one another. Multiple rounds of format-preserving encryption are performed on the plurality of fields of data of the batched set of data to provide an output of format-preserved encrypted data. A round of format-preserving encryption includes calling an encryption function to perform one or more encryption operations on the plurality of fields of data in parallel.

Computer-implemented methods and systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

FIG. 4 depicts examples of latency as a function of block size for throughput-optimized AES/128 engines, in accordance with one or more aspects of the present invention;

FIGS. 6A-6B depict one example of facilitating processing within a computing environment, in accordance with an aspect of the present invention;

DETAILED DESCRIPTION

In accordance with an aspect of the present invention, a capability is provided to facilitate processing within a computing environment. The capability includes, for instance, batched execution of format-preserving encryption (FPE) operations on data fields of, e.g., one or more records of one or more databases. This improves performance relating to encryption, thereby improving system performance.

As indicated above, format-preserving encryption is a collective term of cryptographic permutations generally based on tight loops of iterative, chained, serialized calls to block-oriented cryptographic primitives, such as the Advanced Encryption Standard (AES) block cipher. While primitives common to FPE techniques are relatively slow, and forced serialization limits possible optimizations, in accordance with an aspect of the present invention, the FPE primitives are accelerated through batching, in which related FPE calls are, for instance, simultaneously performed in small groups, such as when processing several records or several fields of one or more records simultaneously from the same database (e.g., one FPE call is performed for a plurality of records or fields per iteration). In one embodiment, if the FPE-providing primitive exhibits performance characteristics typical of block ciphers, a disproportionate speedup over serial FPE implementations when called with small batches is achieved, even without changing the implementation of the technique.

Figure 1:
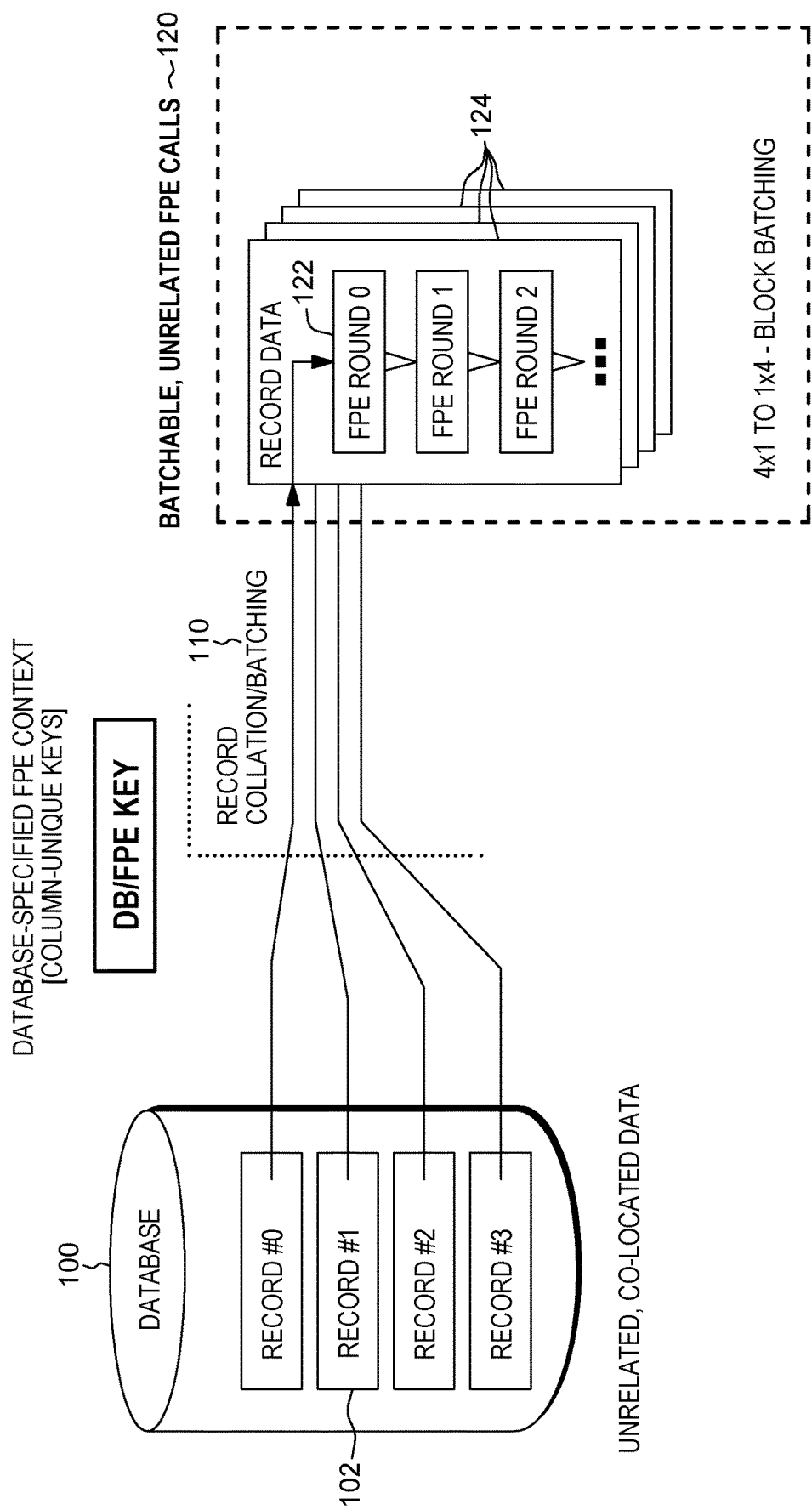
FIG. 1 depicts one example of mapping database records into batchable, unrelated format-preserving encryption calls, in accordance with one or more aspects of the present invention.

One pictorial example of batching format-preserving encryption calls is depicted in FIG. 1. In the example shown, the batching is of a plurality of records (e.g., four records)

of a database. However, in other examples, the batching is of a plurality of fields of one or more records of one or more databases. Further, the batching may be of a different number of records or fields. Other variations are possible.

Referring to FIG. 1, a database 100 includes a number of records. A record includes one or more fields of data. As an example, a database includes one or more tables, in which a table includes a plurality of rows of data, each row being considered a record, and each row including one or more columns (i.e., fields). In the example of FIG. 1, a plurality of records 102 (e.g., records 0-3) are shown. The records shown in the example of FIG. 1 (i.e., records 102) are unrelated, but co-located in database 100. The data of records 102 are, for instance, of a single format/type per field (e.g., column), and have the same security level and keys for each field. Thus, in accordance with an aspect of the present invention, records 102 are collated/batched 110 such that a single format-preserving encryption call 120 on each format-preserving encryption iteration is processed for the plurality of records in parallel. That is, each record of the batch of records goes through a plurality of iterations or rounds 122 of calling an encryption routine (e.g., AES) to perform format-preserving encryption (referred to herein for convenience as FPE rounds). Each format-preserving encryption call processes the plurality of records (e.g., records 0-3) in parallel 124.

In other examples, more or fewer than four records of the database are batched and processed in parallel. Further, fields of one or more records may be batched and processed in parallel. The number of records or fields to be processed in parallel is selected based on performance criteria, as described below.

To exploit batching, in one embodiment, the FPE techniques and their applications share defined characteristics including, for instance:

The underlying primitives used, such as block ciphers, are data-independent. Variations within an FPE technique may change iteration count or other parameters, but does not select a different technique, since FPE tends to be specified as format-dependent combinations of parameters to the primitives.

Since FPE is for individually small messages, it is expected that calls within each FPE invocation is to process a single block of the primitive—or at most a few blocks.

A common characteristic of practically used primitives (i.e., relevant primitives) is their high overhead for single-block calls, and a corresponding, relatively high-performance improvement when blocking input chunks to even slightly larger blocks.

When encrypting databases, or similar collections of highly structured data, the message space of calls to primitives is the same for large numbers of FPE calls.

As an example, databases containing credit card numbers or personally-identifying fields contain many instances of FPE calls for each base type. In FPE terms, for these examples, it is expected that many calls are used to transform, e.g., 15/16-digit (credit card numbers) or 9-digit (id fields) numeric fields, respectively. When transferred into crypto-primitive calls, these will specify different, but still predetermined, lower-level encoding/blocking transformations for the base primitive.

The call sequence for each distinct type is to be data independent.

In typical database scenarios, one may aggregate processing of several fields of the same type, either between different records, or even fields or columns of the same record, without a significant change to processing.

For practical FPE algorithms (i.e., relevant FPE algorithms), identical message spaces and targeted security levels imply identical call sequences to primitives during each FPE invocation as the number of effective rounds is a function of message-space size and targeted security margin.

There may be multiple call sequences in the same database batch: following our previous example, there will be one two parameter sets, one restricted to credit-card numbers, the other one to identification numbers.

Identical call sequences are expected to use the same key material, possibly with minor stream diversification such as tweaking. In one example, one expects FPE calls to use the same database-wide base key and to diversify calls with different initial values for different database columns. If databases are further partitioned into independent derived-key domains, this customization may also be applied as a tweak.

With the above considerations, in accordance with an aspect of the present invention, a database system may collate a small number of simultaneous FPE calls under the same key, possibly using different tweaks but sharing a base key. When N such calls are to be aggregated, each FPE call operates on a single block of data, and N parallel single-block calls are replaced by a single call processing N blocks in, for instance, a single ECB (Electronic Code Book)-mode call.

In one aspect, in addition to a batch API call, specialized knowledge of the FPE engine in the dis/aggregation component is embedded. This component does more than simply collate single block-to-wide block data: it is specialized for applying tweaks and other variant information, as described below.

Figure 2:
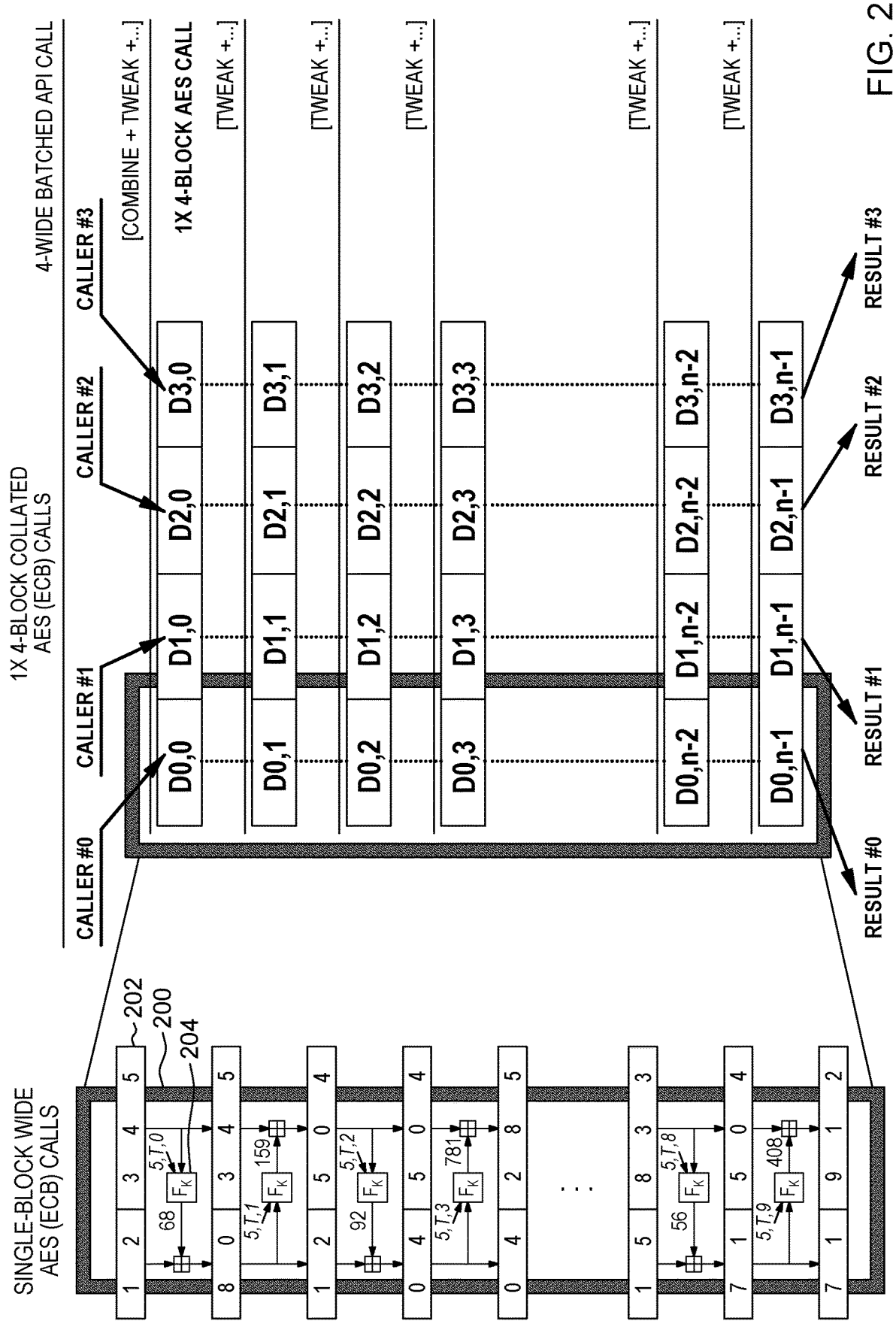
FIG. 2 depicts one example of executing a format-preserving encryption call on a plurality of records in parallel, in accordance with one or more aspects of the present invention.

Further details of batched format-preserving encryption processing are described with reference to FIG. 2. One example of a sample sequence of single-block AES calls from an FPE engine is shown in block 200. In block 200, a record proceeds through a plurality of rounds or iterations of encryption processing. The record is, for instance, a five-digit record 202 that proceeds through a plurality of rounds of calling an encryption routine 204, e.g., AES, to perform format-preserving encryption. Block 200 depicts a plurality of FPE rounds for one caller (e.g., caller #0). In accordance with an aspect of the present invention, processing for a plurality of callers (e.g., 4 callers—caller #0-#3) are processed in parallel, each progressing through rounds of format-preserving encryption for a record (or a field of a record).

One embodiment of performing batched format-preserving encryption, in accordance with one or more aspects of the present invention, is described with reference to FIGS. 3A-3B. In one example, to enable batched FPE execution, a pre-processing analysis phase is employed to establish plans of batched execution, as described with reference to FIG. 3A. Then, during a runtime phase, an extracted plan is executed, as described with reference to FIG. 3B. In the example described, format-preserving execution is being applied to a plurality of fields of one or more records of a database. The records include data having at least one field of an expected format, such as account numbers, identification numbers, etc.

Figure 3A:
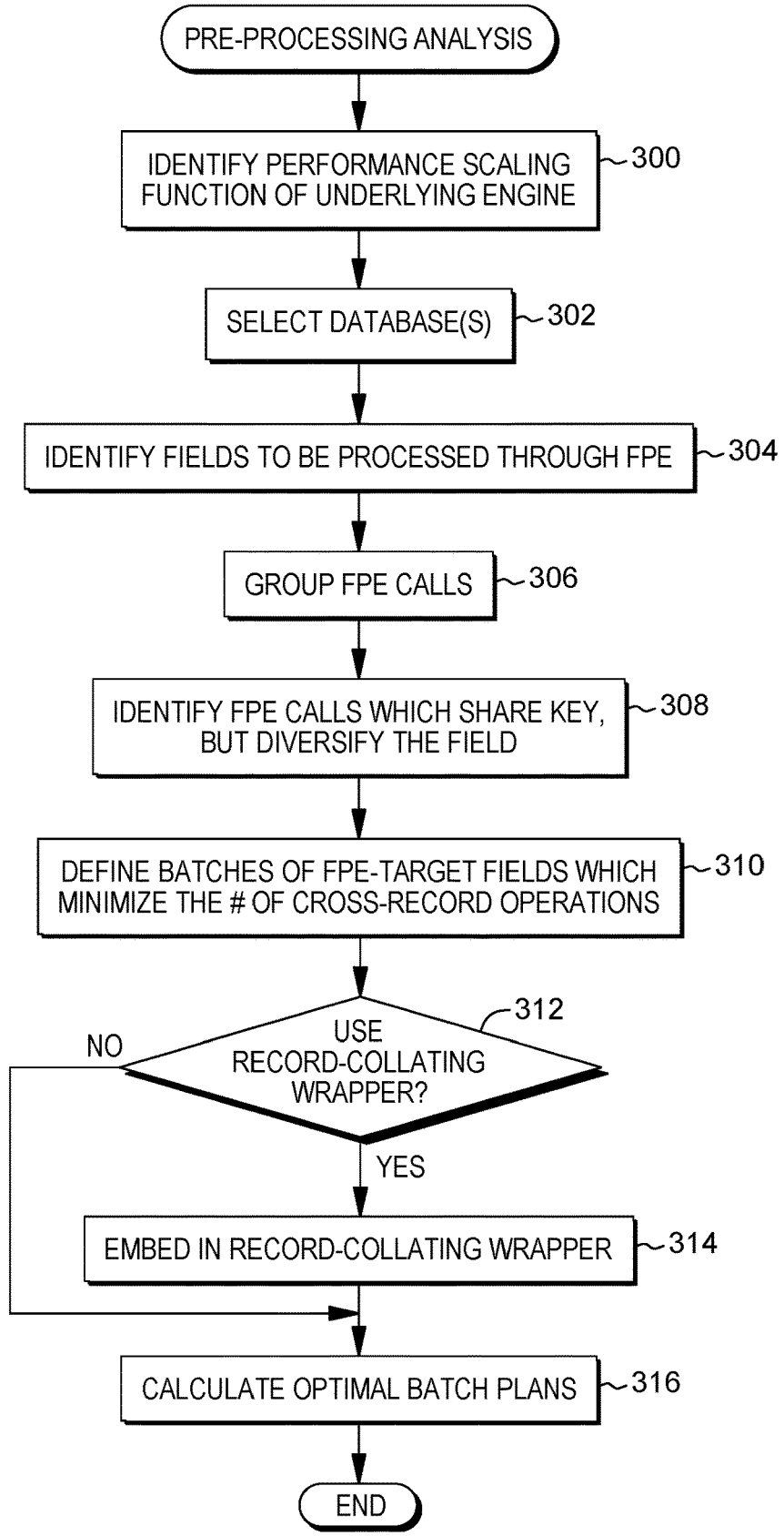
FIG. 3A depicts one example of a pre-processing analysis phase used to identify fields of one or more database records to be batched for format-preserving encryption, in accordance with one or more aspects of the present invention.

Referring to FIG. 3A, one embodiment of the pre-processing analysis phase is described. In one example, this pre-processing is performed by a processor. Initially, a performance-scaling function of an underlying cryptographic engine is identified, STEP 300. For instance, a batch size which maximizes throughput (e.g., minimizes amortized per-call latency) is determined. To determine hardware engine performance profile information for the cryptographic engine, available documentation may be reviewed or established by selected measurements. Libraries supporting the engines may report the throughput measurements.

One or more databases are selected, STEP 302, and for each selected database, fields (e.g., columns) that are to be processed through format-preserving encryption are identified, STEP 304. For instance, fields with confidential data are identified. Format-preserving encryption calls are grouped according to, for instance, base key and FPE-engine execution, STEP 306. For instance, fields of the same type, such as account numbers or identifying information, that share keys and use the same number of FPE iterations may be batched. In one example, it is assumed that account numbers share the same base key—since logically, their FPE-relevant characteristics are the same. For instance, the number of possible values, range of encoded characters, and targeted security level are the same for fields with the same fundamental type. Other characteristics are possible.

Format-preserving encryption calls which share keys, but otherwise, diversify the field, are identified, STEP 308. For instance, relevant FPE techniques may apply round-specific diversification ($D_{i,j}$ for data stream I and round j, respectively). One or more aspects support, e.g., both data and key diversification. As an example, source and target account numbers might be diversified, allowing consistent, but different mappings, even for identical record contents and keys. Diversified fields are to have, in one example, additional pre-processing when batches are assembled, which is to be incorporated into batch-execution plans. In one example, XORing a different constant into source and target account numbers satisfies this goal (e.g., this is the single-block equivalent of a different initial value (IV) in the CBC chained cryptographic mode). Generally, there is no other difference once the batched primitive is called, but the batch plan notes such diversification.

Batches of FPE-target fields are defined which minimize the number of cross-record operations, depending on the previously measured optimal batch size, STEP 310. It is assumed that processing fields within a record is simpler than processing a batch of fields which span multiple records. In one example, it is assumed that each record includes, e.g., four (4) account number fields, and batch throughput is maximized at four block calls:

If the account number fields use the same key, the recommended batch combines four single block calls (the four account number fields) into a single four block call. One of these batches may be issued per record; this allows efficient processing entirely embedded into single record SELECT statements, or similar record-oriented database programming.

If source and destination accounts use different keys, the recommended batch combines two pairs of source account numbers. These two pairs are extracted from two records (and the record processing statement would, for instance, prepare two batches for each record pair; one for 2×2 source, one for 2×2 target account numbers).

A determination is made as to whether a record-collating wrapper is to be used, INQUIRY 312. In one example, if optimal batches involve multiple records, and the base database framework is strictly record-oriented, batch-invoking operations are to be embedded into a record-collating wrapper. As examples, these are scripting calls or other database extensions. Based on determining the record-collating wrapper is to be used, the batch-invoking operations are embedded into a record-collating wrapper, STEP 314.

To further explain, instantiating the 2×2 example from above, in one example, a record-collating wrapper would be specified, as follows:

1. Form a 2×2 batch [of 4×1-block batched FPE] by retrieving columns/fields A and B from two records each, R1 and R2.

This results in, e.g., two SELECT statements returning columns/fields A and B, from different records. The specification/selection of R1/R2 records, i.e., bundling multiple SELECTs to form FPE batches, is opaque detail for aspects of the invention. What is to be noted is that for FPE, A and B share structure and may participate in batched FPE.

The wrapper implementation 'intercepts' two unrelated SELECT statements, as databases tend to be strongly record-oriented at this low level (so R1 and R2 would be assumed entirely unrelated). However, batch mode processing, when the entire database is passed through some repeated computation, already implies an interface suitable for such interception (run a SELECT which fetches each row, does something with the row, then calculate . . . ).

2. Pass the retrieved data blocks, R1.A, R1.B, R2.A and R2.B, through batched-FPE computation, as unrelated data.

3. As the final wrapper step, insert the FPE-transformed columns/fields into where they would be after four unrelated FPE calls. This fits multi-column SELECT statements, but is to be adapted to supply results for the two unrelated SELECTs in this example (since there is no direct counterpart in single-response DB operations).

3.1 In SQL-inspired pseudocode, four individual FPE calls would be described as:

"SELECT FPE(A), FPE(B) . . . from row R1"—unrelated FPE calls, row R1

"SELECT FPE(A), FPE(B) . . . from row R2"— . . . , row R2

In one example, these are executed as parallel invocations of a single select from a batch-processing call (which runs the same SELECT in parallel, exploiting that rows R1 and R2 would be unrelated).

3.2. In a batch-driven system exploiting batched-FPE calls, somewhere at the level of batched SELECTs, the same would be:

1) Find two unrelated SELECTs retuning columns A and B from rows/records R1 and R2

2) Batch-FPE 4x, returning [FPE(R1.A), FPE(R1.B), FPE(R2.A), FPE(R2.B)] as a four-element vector 3) Return the first two vector elements to the SELECT which worked on record R1; they observe the result of SELECT( . . . . FPE(R1.A), FPE(R1.B) . . . )

4) Return the final two vector elements to the SELECT which worked on record R2; they observe the result of SELECT( . . . . FPE(R2.A), FPE(R2.B) . . . )

After embedding the operations in a wrapper, or if the wrapper is not to be used, INQUIRY 312, optionally, one or more optimal batch plans are calculated, STEP 316. As indicated, the output of the pre-processing phase is one or more batch plans having batch definitions. A batch definition includes, e.g., an abbreviated form of environmental assumptions, such as database X, table Y, fields F1 to F4 assuming a four-block batching. Further, in one example, multi-record batches include a collating script or some other definition of how multi-record batches are to be assembled.

In one example, optimal batch plans for the same database are calculated multiple times, assuming a slight variation in hardware performance profiles. In one example, storing plans for a range of optimal batch-size points allows adaptive batch selection. For example, to allow for a level of future-proofing, when executing the query on different processors.

In one example, batch enumeration is an offline activity (i.e., not performed at runtime), and generated plans are essentially free (they are, e.g., enumerations of database fields which fill batches). Thus, batch planning for different batch-performance curves is a possible extension.

Based on generating one or more batch plans, runtime processing is performed for at least one selected plan. In one example, the runtime phase is executed during database processing calls by the database system (referred to herein as the database), using one of the plans specialized for the database and format-preserving encryption conversion. As a particular example, a format-preserving encryption engine of the database performs the processing described in FIG. 3B. One embodiment of the runtime phase is described with reference to FIG. 3B.

Figure 3B:
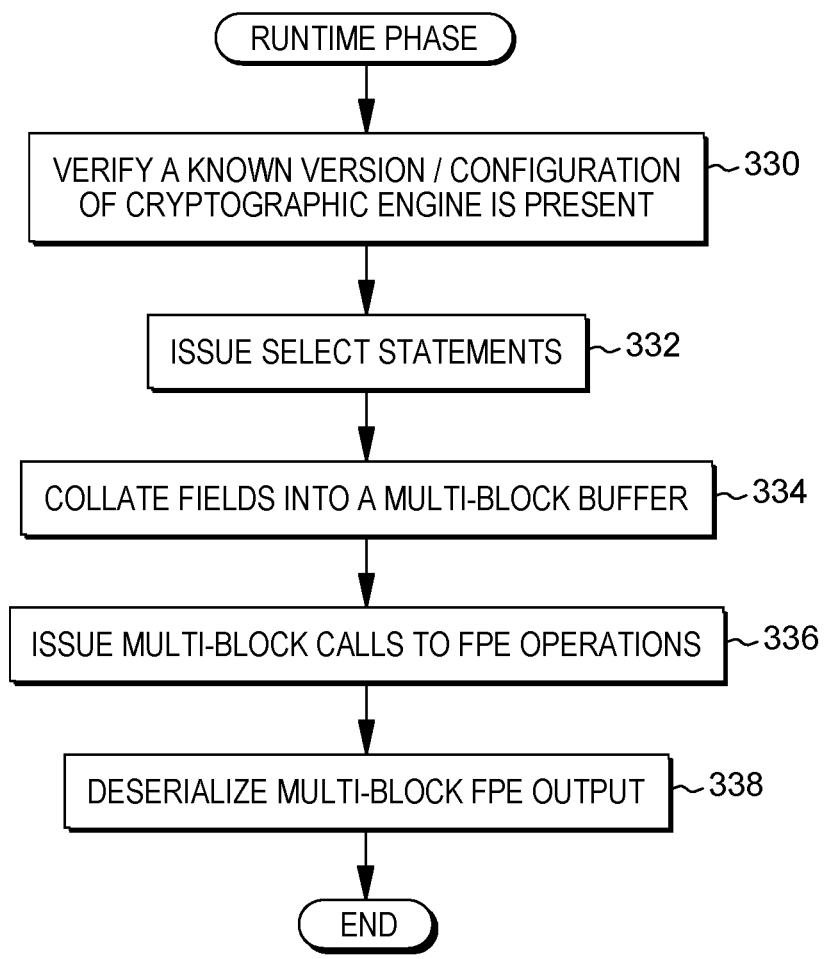
FIG. 3B depicts one example of a runtime phase of executing multiple format-preserving encryption calls, each call processing a plurality of fields of data in parallel, in accordance with one or more aspects of the present invention.

Referring to FIG. 3B, initially, the database verifies that a known version/configuration of cryptographic engine is present when the plan is to be executed, STEP 330. The runtime cross-check may select from multiple plans during the check without incurring latency.

Further, in one example, SELECT statements or their scripted multi-record equivalents are issued, as prescribed by the applicable plan to obtain the records (e.g., the four records) to be collated, STEP 332. For each record, or multi-record processing unit, if applicable, one or more fields referenced by the plan are collated into a single, multi-block buffer, STEP 334. Preparations for this task, such as diversifying fields, does not differ from non-batched FPE invocations. Compared to the actual FPE call costs, these setup operations are insignificant.

Multi-block calls to FPE operations for the fields to be included in the same batch are issued, STEP 336. The plan implies how a multi-block FPE-engine output maps back to FPE output fields. Further, multi-block FPE output is deserialized into the fields to which it should be deposited, STEP 338. In one example, batched FPE calls appear as multi-valued SELECT statements in database terms.

In one aspect, platforms with efficient hardware engines (e.g., hardware cryptographic engines) benefit from batching (e.g., local batching) without encryption technique implementation changes. Example performance numbers are shown in FIG. 4, which are application-level measurements from a selected hardware engine. The following characteristics are observed, in one example:
  The engine is optimized for throughput; performance peaks at, e.g., 40 blocks of the encryption technique (e.g., 640 bytes for AES/128).
  There is an apparent call overhead, prohibitive, when calls are made to individual blocks—coincidentally, this would be a typical FPE invocation.
  Since engine internals are efficient, per-block processing time drops rapidly even for a few blocks. For instance, processing of 4-block units takes less than 1.5 times the latency of a single one-block call; and processing 16-block units takes approximately twice as much as processing a single one-block call.
  Above 32-block units, an incremental performance gain is observed.

In one or more scenarios, when an FPE implementation is backed by these engines, local batches benefit disproportionately for local batches of 2 . . . 20 aggregated calls. This number of FPE fields is reasonable for various types of database applications.

Described herein is the batching of format-preserving operations. In one example, the format-preserving encryption technique is based, directly or indirectly, on block ciphers. The control flow is modified around batched calls, but the input data is not transformed to a specific format. Data which belongs to multiple records, but uses the same key, is aggregated, in one example. Since the cryptographic provider (e.g., the AES engine) is not directly accessible, in one example, from the exposed FPE interface, even if data is aggregated in a single buffer, the FPE API may virtualize multiple calls to multiple callers without exposing their data to each other.

Figure 5A:
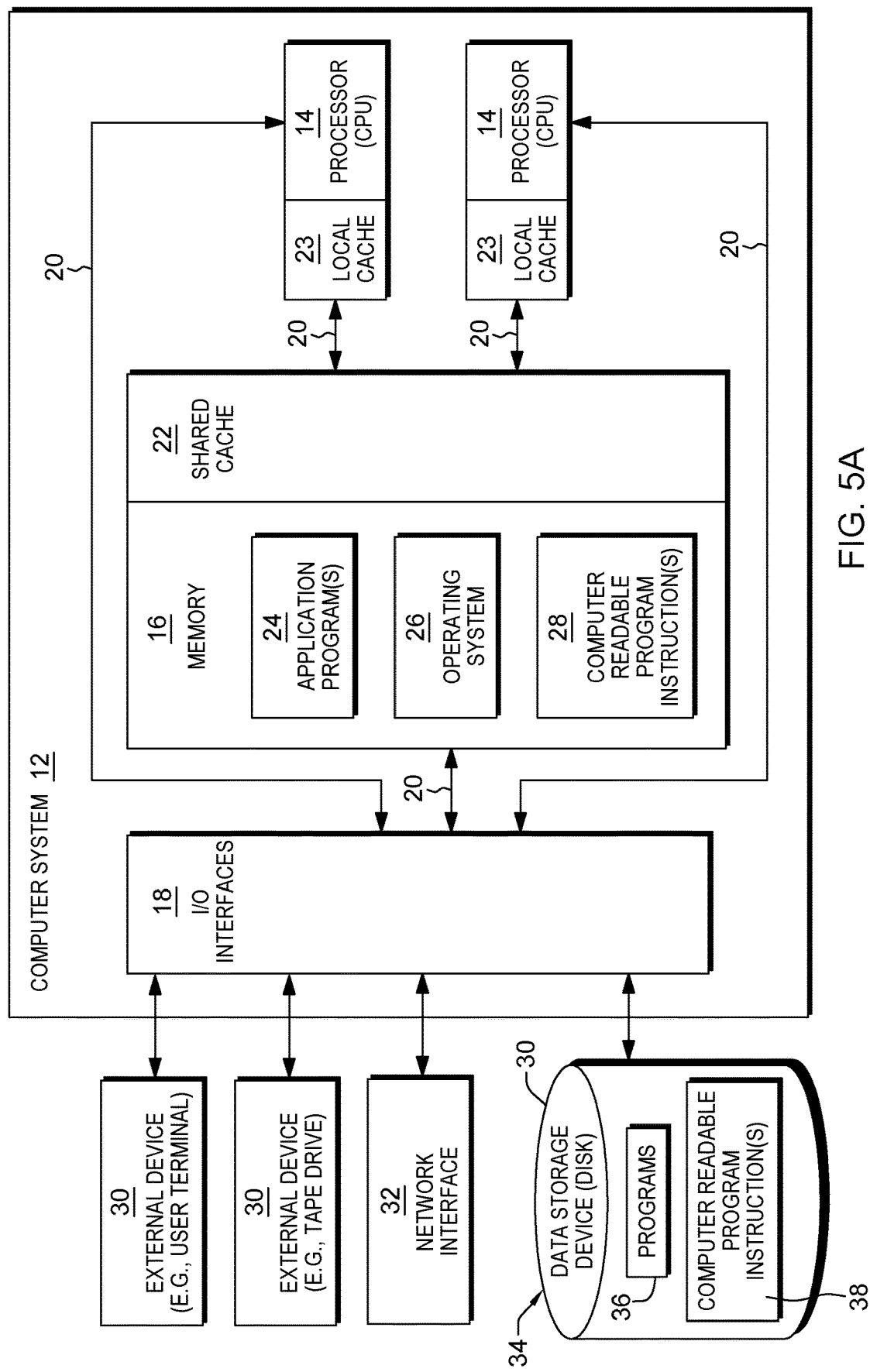
FIG. 5A depicts one example of a computing environment to incorporate and use one or more aspects of the present invention.

One embodiment of a computing environment to incorporate and use one or more aspects of the present invention is described with reference to FIG. 5A. As shown in FIG. 5A, a computing environment 10 includes, for instance, a computer system 12 shown, e.g., in the form of a general-purpose computing device. Computer system 12 may include, but is not limited to, one or more processors or processing units 14 (e.g., central processing units (CPUs)), a memory 16 (a.k.a., system memory, main memory, main storage, central storage or storage, as examples), and one or more input/output (I/O) interfaces 18, coupled to one another via one or more buses and/or other connections 20.

Bus 20 represents one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 16 may include, for instance, a cache 22, such as a shared cache, which may be coupled to local caches 23 of processors 14. Further, memory 16 may include one or more programs or applications 24, an operating system 26, and one or more computer readable program instructions 28. Computer readable program instructions 28 may be configured to carry out functions of embodiments of aspects of the invention.

Computer system 12 may also communicate via, e.g., I/O interfaces 18 with one or more external devices 30 and/or one or more network interfaces 32. Example external devices include a user terminal, data storage devices, such as a tape drive, disk or other data storage devices, a pointing device, a display, etc. In one particular example, a data storage device 34 may store one or more programs 36, one or more computer readable program instructions 38, and/or data, etc. The computer readable program instructions may be configured to carry out functions of embodiments of aspects of the invention.

Network interface 32 enables computer system 12 to communicate with one or more networks, such as a local area network (LAN), a general wide area network (WAN), and/or a public network (e.g., the Internet), providing communication with other computing devices or systems.

Computer system 12 may include and/or be coupled to removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media. It should be understood that other hardware and/or software components could be used in conjunction with computer system 12. Examples, include, but are not limited to: microcode, device drivers, redundant processing units, external disk drive arrays, RAID systems, tape drives, and data archival storage systems, etc.

Computer system 12 may be operational with numerous other general purpose or special purpose computing system environments or configurations. Examples of well-known computing systems, environments, and/or configurations that may be suitable for use with computer system 12 include, but are not limited to, personal computer (PC) systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

In one example, processor 14 is based on the z/Architecture® hardware architecture offered by International Business Machines Corporation, Armonk, N.Y., and is part of a server, such as an IBM Z® server, which is also offered by International Business Machines Corporation and implements the z/Architecture hardware architecture. One embodiment of the z/Architecture hardware architecture is described in a publication entitled, "z/Architecture Principles of Operation," IBM Publication No. SA22-7832-11, $12^{th}$ edition, September 2017, which is hereby incorporated herein by reference in its entirety. The z/Architecture hardware architecture, however, is only one example architecture; other architectures and/or other types of computing environments may include and/or use one or more aspects of the present invention. In one example, the processor executes an operating system, such as the z/OS® operating system, also offered by International Business Machines Corporation.

In one example, a processor, such as processor 14, may execute one or more components to perform one or more aspects of the present invention. These components may be stored in memory, including main memory (e.g., memory 16) and/or one or more caches (e.g., shared cache 22, local cache 23) and/or external storage (e.g., device 34), and may be executed by one or more processors (e.g., processor 14). Many variations are possible.

Figure 5B:
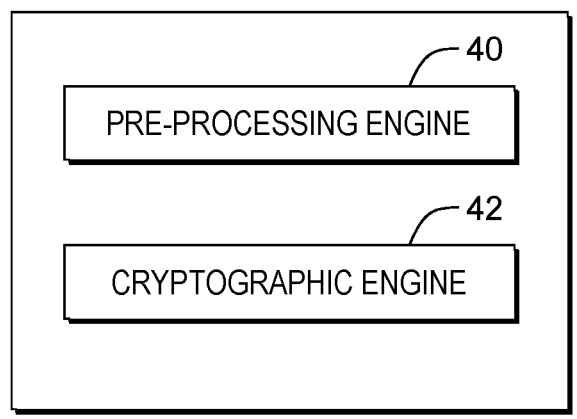
FIG. 5B depicts further details of a processor of FIG. 5A, in accordance with one or more aspects of the present invention.

In one example, referring to FIG. 5B, one or more components of a processor (e.g., processor 14) to perform one or more aspects of the present invention include, for instance, a pre-processing engine 40 to determine records or fields to be collated for format-preserving encryption; and a cryptographic engine to be used in performing format-preserving encryption. The components executed by a processor may be individual components or combined in one component. Further, there may be more, fewer and/or different components. Many variations are possible.

Figure 5C:
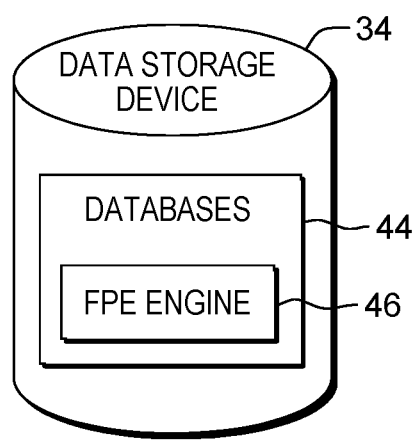
FIG. 5C depicts further details of a data storage device of FIG. 5A, in accordance with one or more aspects of the present invention.

Moreover, further details of data storage device 34 are described with reference to FIG. 5C. In one example, data storage device 34 includes one or more databases 44. A database 44 includes, for instance, a format-preserving engine 46 to batch the records (or fields) and to issue the calls to the encryption technique (e.g., AES).

One or more aspects of the present invention are inextricably tied to computer technology and facilitate processing within a computer, improving performance thereof. As examples, one or more aspects improve the technical field of encryption, improving performance associated therewith, and therefore, improving performance within a processor.

Further details of one embodiment of facilitating processing within a computing environment, as it relates to one or more aspects of the present invention, are described with reference to FIGS. 6A-6B.

Referring to FIG. 6A, a batched set of data for which format-preserving encryption is to be performed is obtained (600). The batched set of data includes a plurality of fields of data, the plurality of fields of data being independent of one another (602). Multiple rounds of format-preserving encryption are performed on the plurality of fields of data of the batched set of data to provide an output of format-preserved encrypted data (604). A round of format-preserving encryption includes calling an encryption function to perform one or more encryption operations on the plurality of fields of data in parallel (606).

As examples, the plurality of fields of data are of one or more records of a database (608), and the round of format-preserving encryption includes using a shared key of the plurality of fields of data in the format-preserving encryption of the plurality of fields of data (610). Further, in one example, at least one field of data of the plurality of fields of data is diversified with respect to other fields of data of the plurality of fields of data (612).

Moreover, in one embodiment, the output of format-preserved encrypted data is deserialized to provide a plurality of format-preserved encrypted fields of data (614).

In one example, referring to FIG. 6B, the obtaining the batched set of data includes issuing one or more select statements to obtain the plurality of fields of data (620), and collating the plurality of fields of data into the batched set of data (622).

A determination is made, in one embodiment, of a number of fields to be included in the batched set of fields, in which the determining is based on a performance scaling function of a hardware engine used in performing the format-preserving encryption (624).

In one embodiment, the obtaining the batched set of data includes determining which fields of data of a database are to be processed through format-preserving encryption (626) and grouping the fields of data to be processed through format-preserving encryption into one or more groups of fields of data based on one or more criteria (628). The plurality of fields of data are selected from a group of fields of data of the one or more groups of fields of data (630). As examples, the one or more criteria include at least one criterion selected from a group of criteria consisting of: same type of field, shared keys, and a same number of format-preserving encryption iterations to be performed (632).

Grouping further includes, in one embodiment, grouping the fields of data based on whether the fields of data are in a same record of the database, in which the plurality of fields of data selected from the group of fields of data are of the same record (634).

Other variations and embodiments are possible.

Performance of techniques which use long chains of serialized calls to cryptographic primitives, each operating on individually small blocks of data, is improved.

Operations are performed on a sufficient number of FPE calls to form batches of some small N simultaneous FPE operations. These calls use the same key but may utilize different tweaks or other diversification An adapter inside database (-aware) code is responsible for replacing multiple calls of the same type to the batched API call. This adapter is to recognize when multiple columns—such as source and target account numbers—may be batched. At least a part of this adapter is included in FPE engine 46.

As a particular example, performance is performed under the following set of constraints:

The base primitive, such as a block cipher, exhibits significant performance improvements when operating on 1<N for some small N. In other words, the product of performance and resource utilization increases considerably slower than a linear function for 1 . . . . N. Primitives in practically used FPE loops (e.g., of relevant FPE modes) exploit the prerequisite performance scaling for reasonable N ranges, since this is a frequent side effect of overhead amortization and optimization possibilities exposed by unrolling (treating multiple cipher invocations as a single unit for optimization purposes).

The number and structure of calls to the base primitive is fixed (or at least, it does not depend on data). This is a prerequisite to aggregating unrelated calls into a buffer of N blocks as a single block.

Simultaneously issued calls in the chain use the same key, but may possibly use different block-specific perturbations ("tweaks", "initialization vectors" or comparable additive data).

Practical database-encryption schemes use such combinations of database-global base keys and possibly column (field)-specific tweaks. As long as tweaking is relatively lightweight, the same procedures remain applicable to row-specific tweaking.

Aggregated calls collate the single (or small-) block inputs through technique-aware batching. This exploits the parallelism of unrelated blocks: the plaintext is a collated (and possibly tweaked) aggregation of single-block plaintext. Actual cryptographic calls operate on this single, larger buffer: performance is that of the beneficial, multi-block call.

Figure 7A:
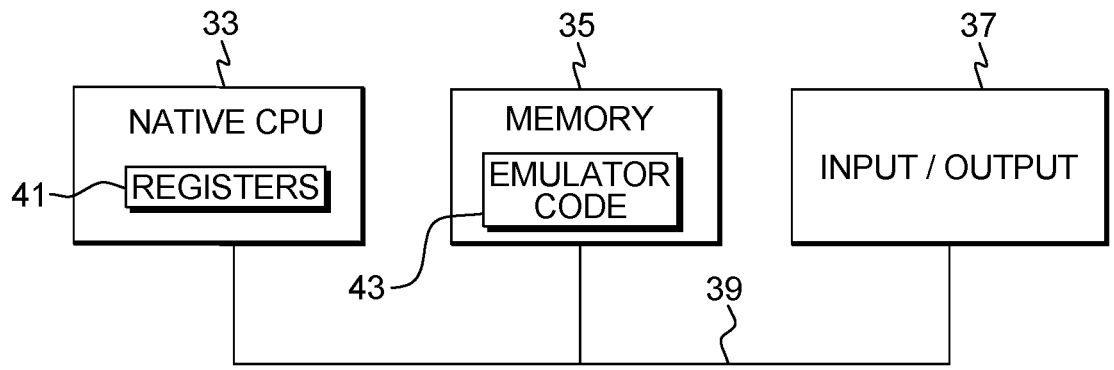
FIG. 7A depicts another example of a computing environment to incorporate and use one or more aspects of the present invention.

Aspects of the present invention may be used by many types of computing environments. Another embodiment of a computing environment to incorporate and use one or more aspects of the present invention is described with reference to FIG. 7A. In this example, a computing environment 31 includes, for instance, a native central processing unit (CPU) 33, a memory 35, and one or more input/output devices and/or interfaces 37 coupled to one another via, for example, one or more buses 39 and/or other connections. As examples, computing environment 31 may include a PowerPC® processor offered by International Business Machines Corporation, Armonk, N.Y.; an HP Superdome with Intel Itanium II processors offered by Hewlett Packard Co., Palo Alto, Calif.; and/or other machines based on architectures offered by International Business Machines Corporation, Hewlett Packard, Intel Corporation, Oracle, or others. IBM, z/Architecture, IBM Z, z/OS, and PowerPC are trademarks or registered trademarks of International Business Machines Corporation in at least one jurisdiction. Intel and Itanium are trademarks or registered trademarks of Intel Corporation or its subsidiaries in the United States and other countries.

Native central processing unit 33 includes one or more native registers 41, such as one or more general purpose registers and/or one or more special purpose registers used during processing within the environment. These registers include information that represents the state of the environment at any particular point in time.

Moreover, native central processing unit 33 executes instructions and code that are stored in memory 35. In one particular example, the central processing unit executes emulator code 43 stored in memory 35. This code enables the computing environment configured in one architecture to emulate another architecture. For instance, emulator code 43 allows machines based on architectures other than the z/Architecture hardware architecture, such as PowerPC processors, HP Superdome servers or others, to emulate the z/Architecture hardware architecture and to execute software and instructions developed based on the z/Architecture hardware architecture.

Figure 7B:
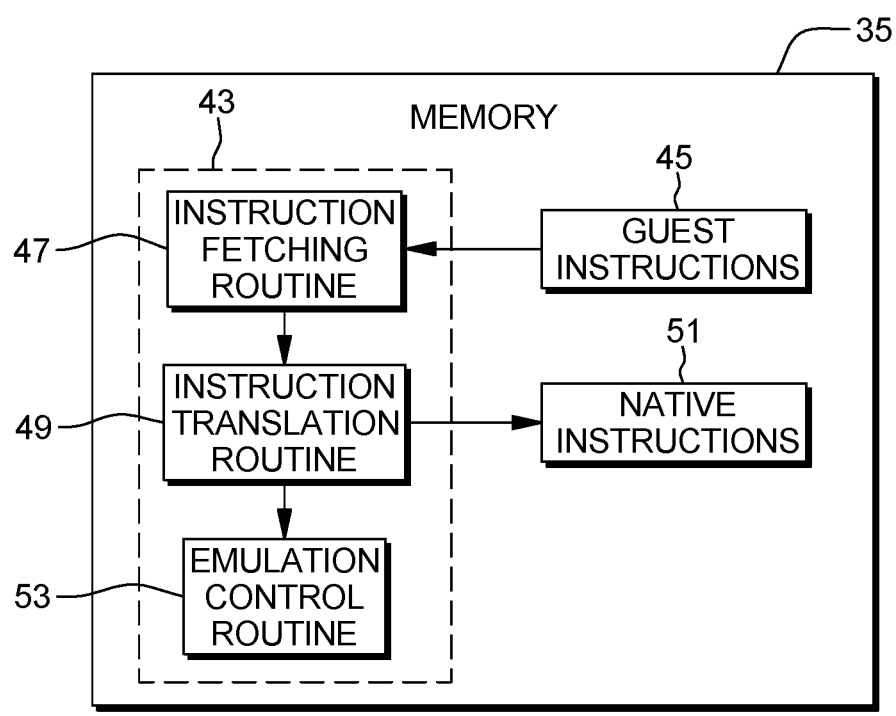
FIG. 7B depicts further details of the memory of FIG. 7A.

Further details relating to emulator code 43 are described with reference to FIG. 7B. Guest instructions 45 stored in memory 35 comprise software instructions (e.g., correlating to machine instructions) that were developed to be executed in an architecture other than that of native CPU 33. For example, guest instructions 45 may have been designed to execute on a processor based on the z/Architecture hardware architecture, but instead, are being emulated on native CPU 33, which may be, for example, an Intel Itanium II processor. In one example, emulator code 43 includes an instruction fetching routine 47 to obtain one or more guest instructions 45 from memory 35, and to optionally provide local buffering for the instructions obtained. It also includes an instruction translation routine 49 to determine the type of guest instruction that has been obtained and to translate the guest instruction into one or more corresponding native instructions 51. This translation includes, for instance, identifying the function to be performed by the guest instruction and choosing the native instruction(s) to perform that function.

Further, emulator code 43 includes an emulation control routine 53 to cause the native instructions to be executed. Emulation control routine 53 may cause native CPU 33 to execute a routine of native instructions that emulate one or more previously obtained guest instructions and, at the conclusion of such execution, return control to the instruction fetch routine to emulate the obtaining of the next guest instruction or a group of guest instructions. Execution of the native instructions 51 may include loading data into a register from memory 35; storing data back to memory from a register; or performing some type of arithmetic or logic operation, as determined by the translation routine.

Each routine is, for instance, implemented in software, which is stored in memory and executed by native central processing unit 33. In other examples, one or more of the routines or operations are implemented in firmware, hardware, software or some combination thereof. The registers of the emulated processor may be emulated using registers 41 of the native CPU or by using locations in memory 35. In embodiments, guest instructions 45, native instructions 51 and emulator code 43 may reside in the same memory or may be disbursed among different memory devices.

The computing environments described above are only examples of computing environments that can be used. Other environments, including but not limited to, non-partitioned environments, partitioned environments, and/or emulated environments, may be used; embodiments are not limited to any one environment. Each computing environment is capable of being configured to include one or more aspects of the present invention. For instance, each may be configured to provide batched format-preserving encryption, in accordance with one or more aspects of the present invention.

One or more aspects may relate to cloud computing.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
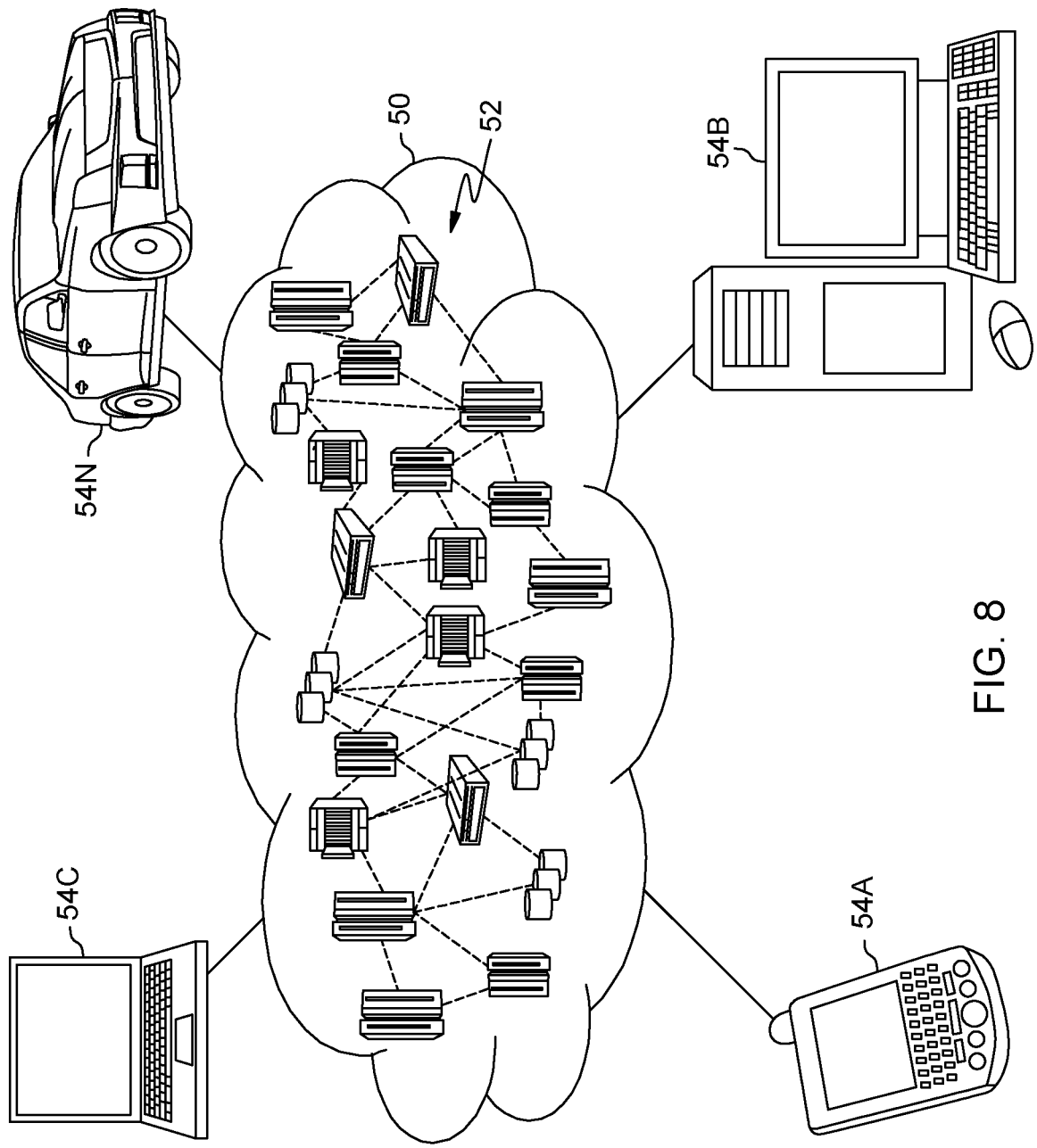
FIG. 8 depicts one embodiment of a cloud computing environment.

Referring now to FIG. 8, illustrative cloud computing environment 50 is depicted. As shown, cloud computing environment 50 includes one or more cloud computing nodes 52 with which local computing devices used by cloud consumers, such as, for example, personal digital assistant (PDA) or cellular telephone 54A, desktop computer 54B, laptop computer 54C, and/or automobile computer system 54N may communicate. Nodes 52 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 52 and cloud computing environment 50 can communicate with any type of computerized device over any type of network and/or network addressable connection (e.g., using a web browser).

Figure 9:
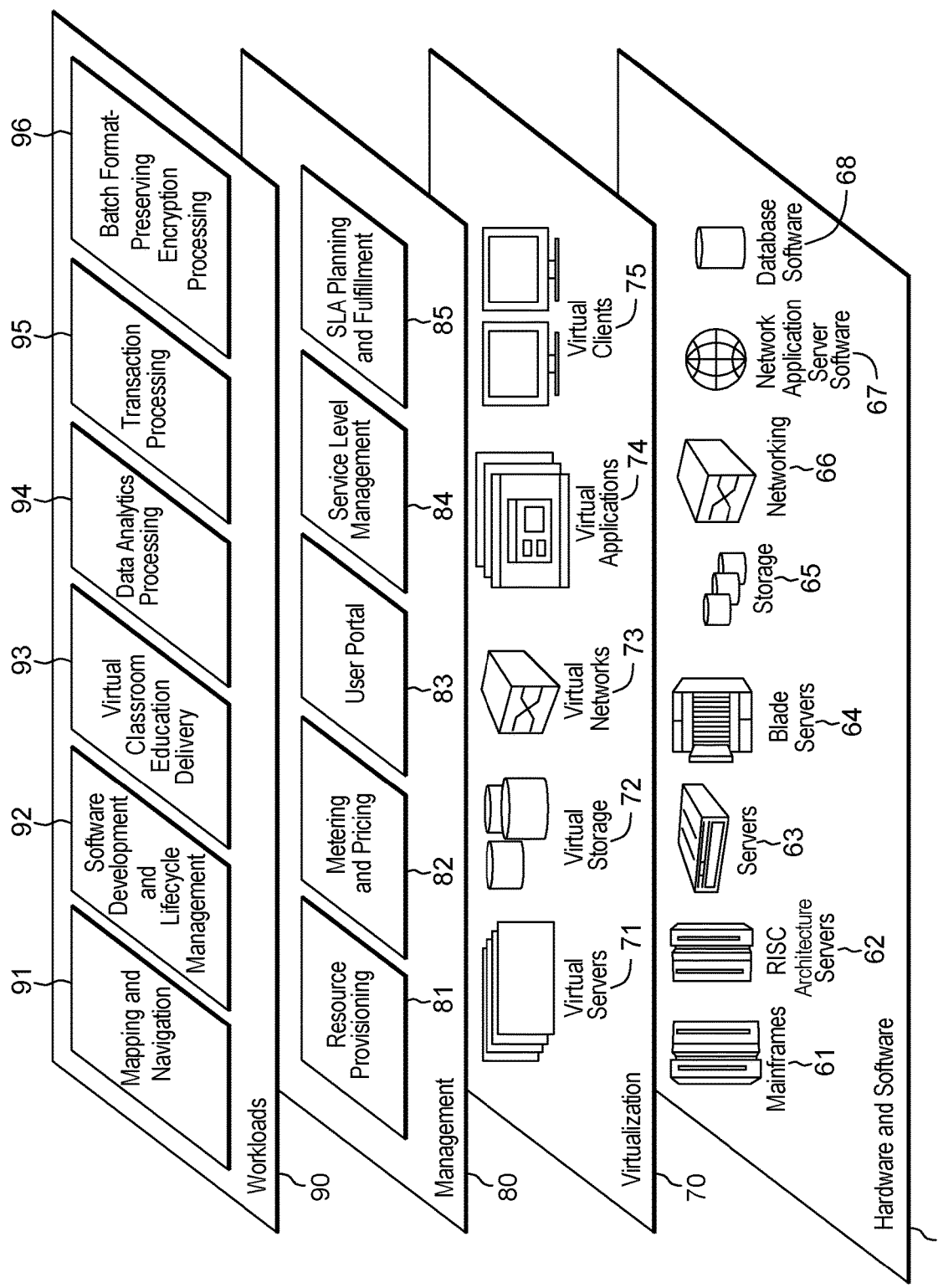
FIG. 9 depicts one example of abstraction model layers.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and batch format-preserving encryption processing 96.

Aspects of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally, or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different types of encryption techniques and/or a different number of blocks may be used. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product for facilitating processing within a computing environment, the computer program product comprising:
    a non-transitory computer readable storage medium readable by a processing circuit and storing instructions for performing a method comprising:
        identifying a batch size which maximizes throughput of an underlying hardware engine to be used in performing format-preserving encryption;
        based on the identified batch size which maximizes throughput of the underlying hardware engine, determining a number of fields of data to be included in batched sets of data;
        obtaining, by the processing circuit, a batched set of data of the batched sets of data for which format-preserving encryption is to be performed, the batched set of data including a plurality of fields of data, the plurality of fields of data being independent of one another;

performing multiple rounds of format-preserving encryption on the plurality of fields of data of the batched set of data to provide an output of format-preserved encrypted data, wherein a round of format-preserving encryption includes calling an encryption function to perform one or more encryption operations on the plurality of fields of data in parallel; and wherein the method further comprises deserializing the output of format-preserved encrypted data to provide a plurality of format-preserved encrypted fields of data.

2. The computer program product of claim 1, wherein the plurality of fields of data are of one or more records of a database.

3. The computer program product of claim 1, wherein the round of format-preserving encryption includes using a shared key of the plurality of fields of data in the format-preserving encryption of the plurality of fields of data.

4. The computer program product of claim 1, wherein at least one field of data of the plurality of fields of data is diversified with respect to other fields of data of the plurality of fields of data.

5. The computer program product of claim 1, wherein the obtaining the batched set of data includes:
    issuing one or more select statements to a database to obtain the plurality of fields of data; and
    collating the plurality of fields of data into the batched set of data.

6. The computer program product of claim 1, wherein the obtaining the batched set of data includes:
    determining which fields of data of a database are to be processed through format-preserving encryption; and
    grouping the fields of data to be processed through format-preserving encryption into one or more groups of fields of data based on one or more criteria, wherein the plurality of fields of data are selected from a group of fields of data of the one or more groups of fields of data.

7. The computer program product of claim 6, wherein the one or more criteria include at least one criterion selected from a group of criteria consisting of: same type of field, shared keys, and a same number of format-preserving encryption iterations to be performed.

8. The computer program product of claim 6, wherein the grouping further includes grouping the fields of data based on whether the fields of data are in a same record of the database, wherein the plurality of fields of data selected from the group of fields of data are of the same record.

9. The computer program product of claim 1, wherein:
    the round of format-preserving encryption includes using a shared key of the plurality of fields of data in format-preserving encryption of the plurality of fields of data; and
    at least one field of data of the plurality of fields of data is diversified with respect to other fields of data of the plurality of fields of data.

10. A computer system for facilitating processing within a computing environment, the computer system comprising:
    a processing circuit;
    a storage device including a format-preserving engine, wherein the computer system is configured to perform a method comprising:
        identifying a batch size which maximizes throughput of an underlying hardware engine to be used in performing format-preserving encryption;
        based on the identified batch size which maximizes throughput of the underlying hardware engine, determining a number of fields of data to be included in batched sets of data;
        obtaining, by the processing circuit executing the format-preserving engine, a batched set of data of the batched sets of data for which format-preserving encryption is to be performed, the batched set of data including a plurality of fields of data, the plurality of fields of data being independent of one another;
        performing multiple rounds of format-preserving encryption on the plurality of fields of data of the batched set of data to provide an output of format-preserved encrypted data, wherein a round of format-preserving encryption includes calling an encryption function to perform one or more encryption operations on the plurality of fields of data in parallel; and
        wherein the method further comprises deserializing the output of format-preserved encrypted data to provide a plurality of format-preserved encrypted fields of data.

11. The computer system of claim 10, wherein the plurality of fields of data are of one or more records of a database.

12. The computer system of claim 10, wherein the round of format-preserving encryption includes using a shared key of the plurality of fields of data in the format-preserving encryption of the plurality of fields of data.

13. The computer system of claim 10, wherein the obtaining the batched set of data includes:
    issuing one or more select statements to a database to obtain the plurality of fields of data; and
    collating the plurality of fields of data into the batched set of data.

14. A computer-implemented method of facilitating processing within a computing environment, the computer-implemented method comprising:
    identifying a batch size which maximizes throughput of an underlying hardware engine to be used in performing format-preserving encryption;
    based on the identified batch size which maximizes throughput of the underlying hardware engine, determining a number of fields of data to be included in batched sets of data;
    obtaining a batched set of data of the batched sets of data for which format-preserving encryption is to be performed, the batched set of data including a plurality of fields of data, the plurality of fields of data being independent of one another;
    performing multiple rounds of format-preserving encryption on the plurality of fields of data of the batched set of data to provide an output of format-preserved encrypted data, wherein a round of format-preserving encryption includes calling an encryption function to perform one or more encryption operations on the plurality of fields of data in parallel; and
    wherein the method further comprises the output of format-preserved encrypted data to provide a plurality of format-preserved encrypted fields of data.

15. The computer-implemented method of claim 14, wherein the plurality of fields of data are of one or more records of a database.

16. The computer-implemented method of claim 14, wherein the round of format-preserving encryption includes using a shared key of the plurality of fields of data in the format-preserving encryption of the plurality of fields of data.

17. The computer-implemented method of claim 14, wherein the obtaining the batched set of data includes:
  issuing one or more select statements to a database to obtain the plurality of fields of data; and
  collating the plurality of fields of data into the batched set of data.

\* \* \* \* \*